United States Patent
Ida et al.

(10) Patent No.: US 8,371,879 B2
(45) Date of Patent: Feb. 12, 2013

(54) CARD CONNECTOR

(75) Inventors: Ayako Ida, Kanagawa (JP); Mitsuhiro Tomita, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 13/246,026

(22) Filed: Sep. 27, 2011

(65) Prior Publication Data

US 2012/0077387 A1    Mar. 29, 2012

(30) Foreign Application Priority Data

Sep. 28, 2010   (JP) ................................. 2010-217270

(51) Int. Cl.
H01R 24/00   (2011.01)

(52) U.S. Cl. ....................................... 439/630; 439/327

(58) Field of Classification Search .................. 439/159, 439/327, 629, 630, 945
See application file for complete search history.

(56) References Cited

U.S. PATENT DOCUMENTS

| | | | | |
|---|---|---|---|---|
| 8,197,272 B2 * | 6/2012 | Matsunaga | ................... | 439/160 |
| 8,231,395 B2 * | 7/2012 | Li | ................................. | 439/159 |
| 8,235,753 B2 * | 8/2012 | Tanaka et al. | ................. | 439/630 |
| 2011/0021079 A1 * | 1/2011 | Tung et al. | ..................... | 439/630 |
| 2011/0092087 A1 * | 4/2011 | Jung et al. | ..................... | 439/159 |

* cited by examiner

*Primary Examiner* — Khiem Nguyen
(74) *Attorney, Agent, or Firm* — Timothy M. Morella

(57) ABSTRACT

A card connector includes a housing having terminal members into which a card is inserted. The card connector also includes a card insertion space, defined by a top plate, a bottom plate and two side plates, the opposing plates mutually facing each other. The side plates linking the edges of the top and bottom plates. The card insertion space also has a front and a rear edge opening in which the front and rear edges of the card are exposed. The card connector also includes connection terminals, integrated with and mounted in the housing and in contact with the terminal members. One of the side plates has a card retaining member, engaged with a first concave member formed on the side edge of the card, and a position-determining member, engaged with a second concave member formed on the side edge of the card to determine the position of the card.

20 Claims, 8 Drawing Sheets

FIG. 5A
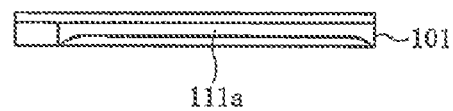
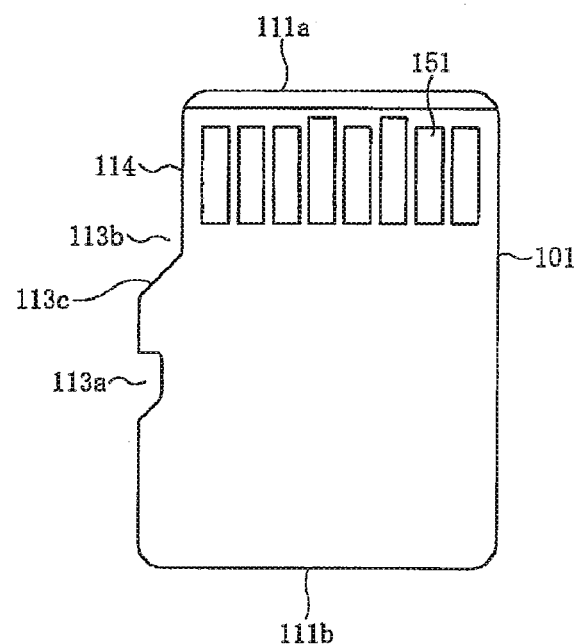
FIG. 5B
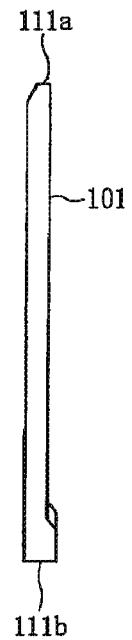
FIG. 5C

CARD CONNECTOR

REFERENCE TO RELATED APPLICATIONS

The Present Disclosure claims priority to prior-filed Japanese Patent Application No. 2010-217270, entitled "Card Connector," filed on 28 Sep. 2010 with the Japanese Patent Office. The content of the aforementioned patent application is fully incorporated in its entirety herein.

BACKGROUND OF THE PRESENT DISCLOSURE

The Present Disclosure relates, generally, to a connector for cards, and, more particularly, to a highly reliable card connector having a simple structure, but yet being capable of securely retaining the card, is compact in size and can be easily manufactured at reduced cost.

Traditionally, electronic equipment may be equipped with card connectors for use with various types of memory cards. In recent years, as electronic equipment is reduced in size and price, easily manufactured card connectors having simple structures, and compact in size with reduced cost, have been proposed. An example is found in Japanese Patent Application No. 2004-146166.

FIG. 8 shows a traditional card connector. In FIG. 8, a housing 811 for the card connector possesses flat-plate-like bottom wall member 811b; deep-end wall member 811a, erected from and extending along the front edge of bottom wall member 811b; and side wall member 811c, extending in the front-back direction along the left and right sides of bottom wall member 811b.

On bottom wall member 811b, a plurality of terminal-accommodating openings 811e are formed in a horizontally aligned manner. In each terminal-accommodating opening 811e, arm member 851d of terminal 851, as well as contact member 851b connected to the tip of arm member 851d, are accommodated. Terminal 851 is molded so as to be integrated with housing 811. In other words, housing 811 is formed by filling a resin in the cavity of a metal mold within which terminal 851 is preliminarily set. Thereby, terminal 851 is integrally mounted onto housing 811, with the main body buried within bottom wall member 811b, arm member 851d and contact member 851b exposed within terminal-accommodating opening 811e, and tail member 851c protruding from the rear edge of bottom wall member 811b.

First fixating metal fitting 852 and second fixating metal fitting 853 are also integrally molded with housing 811, in a similar manner to terminal 851. Moreover, when the tip of a memory card (not shown in FIG. 8) is inserted into housing 811, a contact pad provided on the back side of the memory card comes in contact with contact member 851b of terminal 851, and thus conduction takes place.

However, in a traditional card connector, because only the back side and the right/left side surfaces on the tip of the memory card are supported by housing 811, it is not possible to retain the memory card in a secure manner. Thus, in the case in which electronic equipment onto which the card connector is mounted receives some impact, for example, the position of the memory card may shift, the contact pad of the memory card and contact member 851b of terminal 851 may lose mutual contact, or the whole memory card may become detached from the card connector.

SUMMARY OF THE PRESENT DISCLOSURE

The purposes of the Present Disclosure are to solve the problems stated above, and to provide a highly reliable card connector which has a simple structure but yet is capable of securely retaining the card, is compact in size, and can be easily manufactured at reduced cost. Accordingly, a card connector of the Present Disclosure comprises a housing into which a card with terminal members is inserted, and connection terminals installed on the housing and in contact with the terminal members of the card, wherein the housing has a card insertion space defined in four directions by a top plate and a bottom plate that are mutually facing, as well as by a pair of mutually facing side plates that link together the two edges of the top plate and the bottom plate; the connection terminals are formed so as to be integrated with the housing; the card insertion space has a front edge opening and a rear edge opening in which the front edge and the rear edge of the inserted card are exposed; and one of the side plates has a card retaining member that is engaged with a first concave member formed on the side edge of the inserted card to retain the card, as well as a position-determining member that is engaged with a second concave member formed on the side edge of the inserted card to determine the position of the card in the front-back direction and in the width direction.

In another card connector according to the Present Disclosure, the top plate has a front top plate and a rear top plate that are respectively provided close to the front edge and the rear edge of the housing, as well as a top plate opening that is formed between the front top plate and the rear top plate; the bottom plate has a front bottom plate and a rear bottom plate that are respectively provided close to the front edge and the rear edge of the housing, as well as a bottom plate opening that is formed between the front bottom plate and the rear bottom plate; the front top plate and the front bottom plate enclose at least a part of the front half of the card with the pair of the side plates, and the rear top plate and the rear bottom plate enclose at least a part of the rear half of the card with the pair of the side plates.

Yet another card connector according to the Present Disclosure also has reinforcing metal fittings that are integrated with the housing; the reinforcing metal fitting has a metal fitting main body extending in the width direction of the housing, a card retaining member connected to one end of the metal fitting main body, and a side plate reinforcing member connected to the other edge of the metal fitting main body, and the side plate reinforcing member faces the card retaining member and is formed so as to be integrated with the other side plate.

In yet another card connector according to the Present Disclosure, the position-determining member further has an inclined stopper that comes in contact with an inclined member of the second concave member of the card.

Thus, according to the Present Disclosure, it becomes possible to provide a highly reliable card connector that has a simple structure, but yet is capable of securely retaining the card, is compact in size and can be easily manufactured at reduced cost.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 5 is a three-view drawing showing a card according to an embodiment of the Present Disclosure, where (a) is a front view; (b) is a bottom view; and (c) is a side view;

DESCRIPTION OF THE PREFERRED EMBODIMENTS

Figure 1:
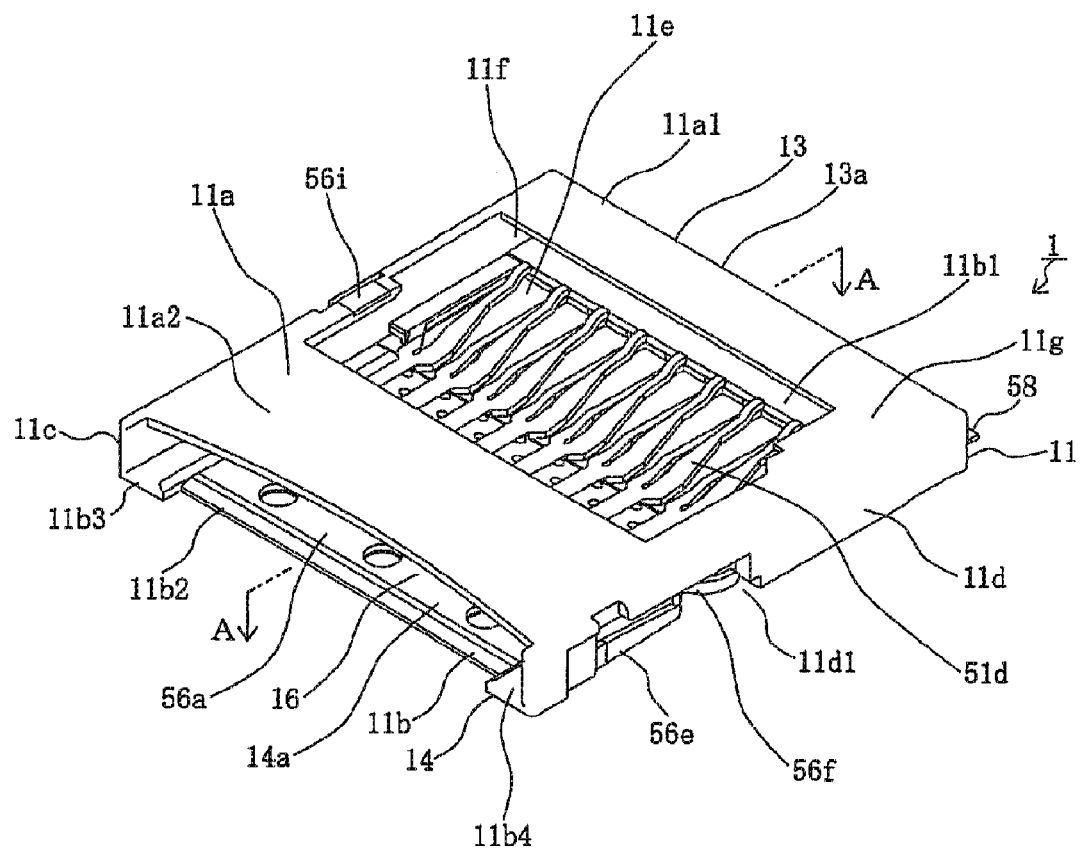
FIG. 1 is an oblique view of a card connector according to an embodiment of the Present Disclosure.

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the Figures, reference numeral 1 represents the card connector of an embodiment of the Present Disclosure; the card connector is mounted onto electronic equipment not shown in the figures. Moreover, within card connector 1, card 101 (discussed later) is inserted; through card connector 1, card 101 is mounted onto the electronic equipment. Further, examples of the electronic equipment include personal computers, cellular phones, personal data assistants, digital cameras, video cameras, music players, game players, car navigation devices, and the like; however, it may be any type of electronic equipment. Additionally, card 101 may include any type of card. However, in this embodiment of the Present Disclosure, an explanation is provided based on the assumption that the card is a memory card.

Herein, card connector 1 is formed as follows: a conductive plate-like material constituted with a metal and the like is punched and the punched plate piece is bended so that the resulting card connector is formed to be integrated with housing 11, which is integrally formed using an insulating material such as a synthetic resin; the card connector is also equipped with terminals 51 as a plurality of connection terminals mounted onto housing 11. Typically, terminals 51 become integrated with housing 11 through over-molding. In other words, housing 11 is formed by filling a resin into the cavity of a metal mold in which terminals 51 have been preliminarily set.

As shown in the Figures, housing 11 is an entirely flat member having a rectangular box shape, and comprises the following members: top plate 11a, which has an approximately rectangular shape; bottom plate 11b, which has an approximately rectangular shape and which faces top plate 11a; and first side plate 11c and second side plate 11d, which are extended in the direction perpendicular with top plate 11a and bottom plate 11b as well as in the front-back direction, and which are side plates for joining the right/left side edges of top plate 11a and the right/left side edges of bottom plate 11b. Moreover, on second side plate 11d, position-determining member 11g and side opening 11d1 are formed. The space that is defined in four directions by top plate 11a, bottom plate 11b, first side plate 11c, and second side plate lid constitutes card insertion space 16 into which card 101 is inserted.

In the Figures, reference numerals 13 and 14 represent the front edge and the rear edge of card connector 1; in other words these represent the front edge and the rear edge of housing 11. Moreover, reference numerals 13a and 14a represent a front edge opening and a rear edge opening of card insertion space 16. Moreover, top plate 11a has front top plate 11a1, which is provided close to front edge 13 of housing 11, and rear top plate 11a2, which is provided close to rear edge 14 of housing 11; top plate opening 11f of an approximately rectangular shape is formed between front top plate 11a1 and rear top plate 11a2. In the example shown in the figures, front top plate 11a1 and rear top plate 11a2 respectively take a slender rectangular shape extending in the width direction of housing 11.

Moreover, bottom plate 11b has front bottom plate 11b1, which is provided in a manner so as to face front top plate 11a1 in the vicinity of front edge 13 of housing 11, and rear bottom plate 11b2, which is provided in a manner so as to face rear top plate 11a2 in the vicinity of rear edge 14 of housing 11; bottom plate opening lie of an approximately rectangular shape, which is provided in a manner so as to face top plate opening 11f, is formed between front bottom plate 11b1 and rear bottom plate 11b2. Similar to front top plate 11a1 and rear top plate 11a2, front bottom plate 11b1 and rear bottom plate 11b2 respectively take a slender rectangular shape extending in the width direction of housing 11. Moreover, front bottom plate 11b1 has first side bottom member 11b3 and second side bottom member 11b4, which extend in the front-back direction in the form of a slender belt along the left and right side edges. Moreover, first side bottom member 11b3 and second side bottom member 11b4 are respectively connected to the lower edges of first side plate 11c and second side plate 11d. Bottom plate 11b has a plurality of terminal retainers 11b5, which extend forward from the front edge of rear bottom plate 11b2 and are arranged in a comb-teeth-like manner.

Figure 2:
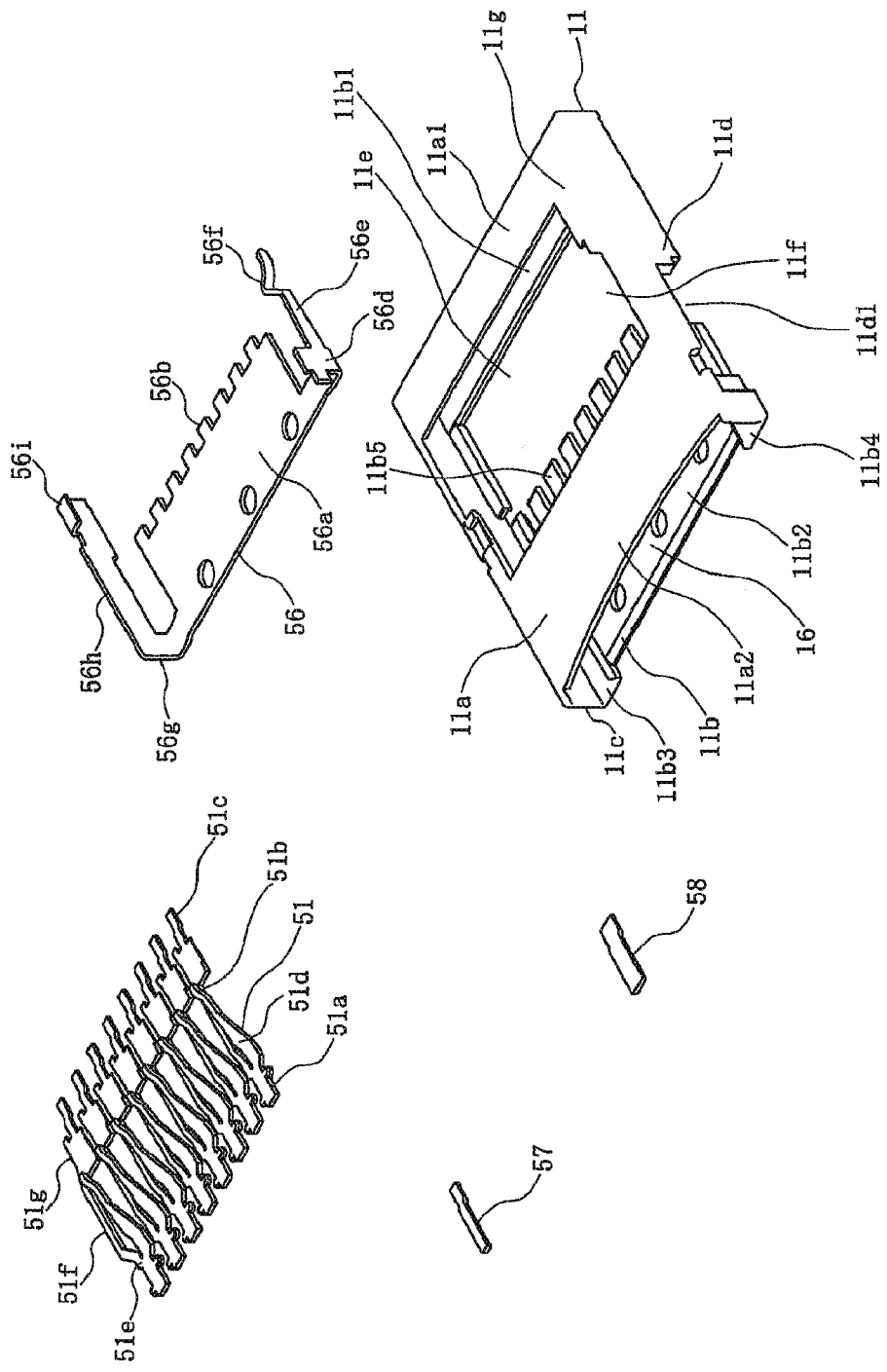
FIG. 2 is an exploded view of the card connector of FIG. 1.

Moreover, terminals 51, each being a member taking a slender belt-like shape extending in parallel to each other in the front-back direction, are arranged in a mutually parallel manner in a manner so that the adjacent terminals are not in mutual contact. As shown in FIG. 2, each of terminals 51 has the following members: main body 51a, which extends in the front-back direction; branching member 51e which is connected to the front edge of main body 51a; arm 51d and linking member 51f, which extend forward from the front edge of branching member 51e; contact member 51b, which is connected to the tip of arm 51d; front base member 51g, which is connected to the front edge of linking member 51f; and tail member 51c, which extends forward from the front edge of front base member 51g.

Main body 51a is sandwiched between terminal retainers 11b5 on the right/left sides thereof. Moreover, front base member 51g is embedded in front bottom plate 11b1 and is retained therein. Moreover, arm 51d and linking member 51f are exposed within bottom plate opening 11e. Tail member 51c is exposed forward from the front edge of front bottom plate 11b1. Moreover, tail member 51c is electrically and physically connected through a connection means such as welding and the like, to the connection pad exposed on the surface of a circuit substrate (not shown in the figures). Due to the above, terminals 51 becomes conductive through the connection pad and the like to the conductive trace equipped on the circuit substrate.

Moreover, arm 51d is inclined to main body 51a and branching member 51e in a manner so that the tip thereof faces upward. Therefore, contact member 51b is located at a location higher than the upper surface of bottom plate 11b. Moreover, arm 51d functions as a cantilever, the shape of which is deformed in a flexible manner.

Due to the constitution stated above, contact member 51b is flexibly pressed against contact pad 151 which is equipped on card 101 inserted in card insertion space 16, and thus the conductively between contact pad 151 and contact member 51b is secured. Moreover, linking member 51f is provided in a manner so that the central axis thereof in the longitudinal direction is shifted towards the opposite side of contact member 51b relative to the central axis of main body 51a in the longitudinal direction. In other words, linking member 51f is preferably off-set on the opposite side of contact member 51b relative to main body 51a. With such constitution stated above, the central axis in the longitudinal direction of the portion joining arm 51d/contact member 51b and linking member 51f and the central axis in the longitudinal direction of main body 51a can be rendered mutually closer, and thus the distance between adjacent terminals 51 can be narrowed, which shortens the resulting pitch.

In the Figures, reference numeral 56 represents a reinforcing metal fitting constituted with a metal plate similar to a metal plate constituting terminals 51, and includes the following members: metal fitting main body 56a, which takes an approximately rectangular shape and extends in the width direction of housing 11; a plurality of cut-terminal roots 56b, which extend forward from the front edge of metal fitting main body 56a and are arranged in a comb-teeth-like manner; first supporting member 56g and second supporting member 56d, which extend in the lateral direction from the right/left edges of metal fitting main body 56a and are bended in the course of the extension thereof into a perpendicular angle; side plate reinforcing member 56h, which extends forward from the front edge of first supporting member 56g; top plate reinforcing member 56i, which is connected to the tip of side plate reinforcing member 56h in a bended manner; card retaining member 56e which extends forward from the front edge of second supporting member 56d, and card retaining convex member 56f, which is connected to the tip of card retaining member 56e.

Moreover, at least a part of the rear surface of metal fitting main body 56a is connected to the upper surface of rear bottom plate 11b2 in an integrated manner and retained therein. Moreover, at least a portion of first supporting member 56g and second supporting member 56d is embedded within first side plate 11c and second side plate lid and retained therein.

Moreover, card retaining member 56e and card retaining convex member 56f are exposed within side opening 11d1, and thus card retaining convex member 56f protrudes, facing the inside of card insertion space 16. Moreover, card retaining member 56e functions as a cantilever, the shape of which is deformed in a flexible manner in the width direction of housing 11. With such constitution as stated above, card retaining convex member 56f is inserted into first concave member 113a (stated later), which is formed on a side edge of card 101 inserted within card insertion space 16, and engaged with first concave 113a; thus card retaining convex member 56f becomes capable of securely retaining card 101.

In the Figures, reference numerals 57 and 58 are a first fixating metal fitting and a second fixating metal fitting which are constituted with a plate material similar to the material constituting terminals 51; each of these is a slender plate member of an approximately rectangular shape. First fixating metal fitting 57 and second fixating metal fitting 58 are formed independently from reinforcing metal fitting 56; however, first fixating metal fitting 57 and second fixating metal fitting 58 are a type of reinforcing metal fittings, and at least a part of them is embedded within front bottom plate 11b1 and retained therein. Moreover, the front edges of first fixating metal fitting 57 and second fixating metal fitting 58 are exposed from the front edge of front bottom plate 11b1 in the forward direction, and are electrically and physically connected through a connection means such as welding and the like, to the fixation pad exposed on the surface of the circuit substrate (not shown in the figures). Moreover, first fixating metal fitting 57 and second fixating metal fitting 58 are provided in the vicinity of the right/left edges of housing 11, and are located outside of the right/left direction relative to tail member 51c of terminal 51.

Moreover, in the present embodiment, as stated later, terminals 51, reinforcing metal fitting 56, first fixating metal fitting 57, and second fixating metal fitting 58 are members that are formed by punching the same plate material, bending the punched pieces, and over-molding the bended pieces onto housing 11 in an integrated manner. With such constitution as stated above, between each terminal 51 and reinforcing metal fitting 56, or more specifically, between the rear edge of main body 51a of each terminal 51 and the front edge of cut-terminal roots 56b of reinforcing metal fitting 56 (as shown in FIG. 3), cutting space 59 is formed, which is provided in order to cut off each terminal 51 from reinforcing metal fitting 56.

Figure 3:
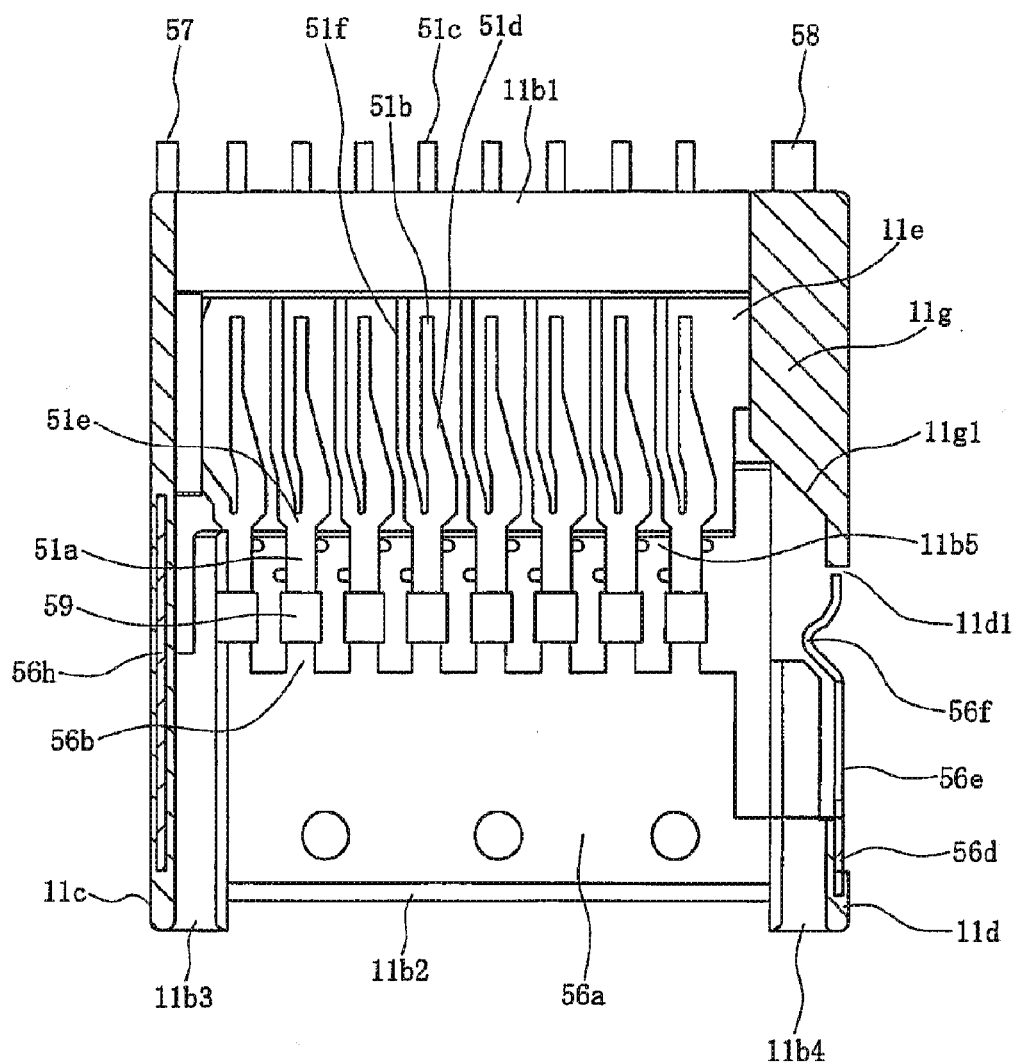
FIG. 3 is a cross-sectional view of the card connector of FIG. 1, taken in the direction indicated by Arrows A-A.

Moreover, as shown in FIG. 3, position-determining member 11g of housing 11 is formed in the vicinity of the front edge of second side plate 11d in an integrated manner; it is a part that is formed to be thicker in the width direction than other parts of second side plate 11d, and it is equipped with stopper 11g1, which is formed on the rear edge thereof. Moreover, as stated previously, the front edge of card insertion space 16 constitutes front edge opening 13a, and is open. Therefore, as stated later, card 101, which is inserted within card insertion space 16, is exposed from front edge 13 in the forward direction without front edge 111a thereof coming in contact with housing 11.

Moreover, the inner surface of position-determining member 11g is closer to the inner surface of first side plate 11c than any other portion of second side plate 11d. In other words, the space between the inner surface of position-determining member 11g and the inner surface of first side plate 11c is narrower than the space between the inner surface of any other portion of second side plate lid and the inner surface of first side plate 11c. Moreover, the space between the inner surface of position-determining member 11g and the inner surface of first side plate 11c is formed so as to be slightly larger than the width of narrow width member 114 (stated later) which is formed close to front edge 111a of card 101. With such a constitution as stated above, card 101, which is inserted within card insertion space 16, is aligned in the width direction by causing narrow width member 114 to enter the space between position-determining member 11g and first side plate 11c.

Concerning the manufacturing method for card connector 1, a plate material constituted with a conductive material such as metal and the like is punched and bended by utilizing a machine tool such as a press and the like to form a preliminary form of terminal 61 in an integrated manner, as shown in (a).

At this time, the punching/bending processes may be conducted at the same time and conducted sequentially. Moreover, preliminary form of terminal 61 may be formed in any type of processing method; examples of such method include laser processing, etching, etc.

Preliminary form of terminal 61 includes a pair of carriers 62, which extend in a mutually parallel manner, a pair of frames 63, which extend in the direction perpendicular to carriers 62; and terminals 51, reinforcing metal fitting 56, first fixating metal fitting 57, and second fixating metal fitting 58, which are all connected to carriers 62. Carriers 62, frames 63, terminals 51, reinforcing metal fitting 56, first fixating metal fitting 57, and second fixating metal fitting 58 are members that are constituted with the same plate material.

Herein, to one of carriers 62, reinforcing metal fitting 56 is connected through reinforcing metal fitting connecting member 64. Moreover, to the other carrier 62, the front edge of each terminal 51, namely the front edge of tail member 51c, is connected through terminal front connecting member 65. Moreover, the rear edge of each terminal 51, namely the rear edge of main body 51a, is connected to metal fitting main body 56a through terminal rear connecting member 68. Moreover, on the external surface of terminal front connecting member 65 of one of carrier 62 stated above, first fixating metal fitting 57 and second fixating metal fitting 58 are connected through first fixating metal fitting connecting member 66 and second fixating metal fitting connecting member 67.

Carriers 62 and frames 63 are members that are held by transport equipment, machine tools, tools, jigs, and operators in the processes of manufacturing card connector 1, or terminals 51, reinforcing metal fitting 56, first fixating metal fitting 57, and second fixating metal fitting 58 in order to easily transport and determine the positions of terminals 51, reinforcing metal fitting 56, first fixating metal fitting 57, and second fixating metal fitting 58, and thus carriers 62 and frames 63 are removed in the final stage of manufacturing. Moreover, in the example shown in the figures, terminal 51, reinforcing metal fitting 56, first fixating metal fitting 57, and second fixating metal fitting 58 constitute a set. However, generally, each carrier 62 is a long slender belt-like plate material, and a multiple number of sets, each set constituted with terminal 51, reinforcing metal fitting 56, first fixating metal fitting 57, and second fixating metal fitting 58, are arranged in a parallel manner and are mutually connected, with frames 63 in between them. Subsequently, over-molding is conducted to cover at least a part of terminal 5, reinforcing metal fitting 56, first fixating metal fitting 57, and second fixating metal fitting 58 to form housing 11, which is constituted with an insulting material, such as synthesized resin and the like, in an integrated manner, as shown in FIG. 4 (*b*).

Typically, housing 11 is constituted in the following manner: front bottom plate 11b1 covers the entire portion of front base member 51g, at least a part of tail member 51c and linking member 51f both of terminal 51, and a part of first fixating metal fitting 57 and second fixating metal fitting 58; rear bottom plate 11b2 is integrated at least with a part of the back side of metal fitting main body 56a; terminal retainer 11b5 is integrated at least with a part of a side edge of main body 51a of terminal 51; and first side plate 11c and second side plate lid cover at least a part of first supporting member 56g and second supporting member 56d. Moreover, arm 51d of terminal 51, the entire portion of contact member 51b, and a large part of linking member 51f, are exposed within bottom plate opening lie, and these members are not covered by the insulting material. Moreover, terminal rear connecting member 68 is not covered by the insulating material, and it is located at a position facing top plate opening 11f. Moreover, top plate opening 11f is formed to be larger than the size of bottom plate opening lie.

Figures 4A, 4B, 4C:
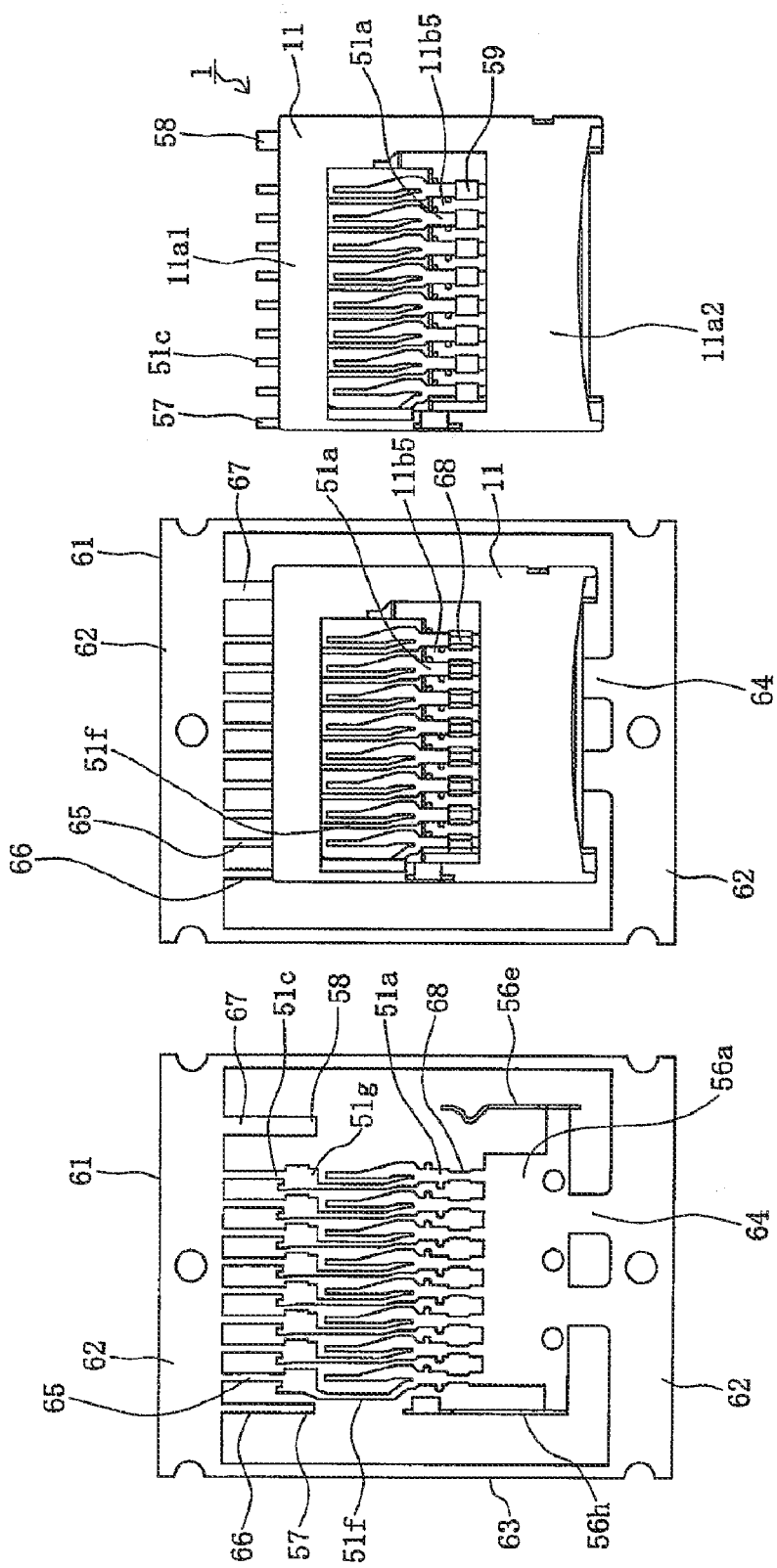
FIG. 4 is a plan view showing the manufacturing steps for the card connector of FIG. 1, where (a) is an illustration showing a preliminary form of a terminal; (b) is an illustration showing the preliminary form of a terminal over-molded; and (c) is an illustration showing the completed card connector.

Subsequently, as shown in FIG. 4 (*c*), reinforcing metal fitting connecting member 64, terminal front connecting member 65, first fixating metal fitting connecting member 66, and second fixating metal fitting connecting member 67 are cut off, and carriers 62 and frames 63 are removed; thus, card connector 1 is obtained. In this case, when terminal rear connecting member 68 is cut off and removed, cut-off space 59 is formed, and each terminal 51 is detached from reinforcing metal fitting.

Card 101 may take the shape shown in FIG. 5. Card 101 takes an approximately rectangular shape as the overall shape thereof. Moreover, at a location close to the front edge on the back side, a multiple number of contact pads 151, functioning as the terminal members, are arranged in a parallel manner along front edge 111a.

Moreover, on one side edge of card 101 (the left side edge in FIG. 5 (*b*)), first concave 113a and front notch 113b (a second concave) are formed. Front notch 113b is a member in which the corner formed by front edge 111a of card 101 and the above-stated side edge is notched for a certain range; it contains inclined member 113c inclined in the front-back direction, and it takes an approximately trapezoid shape.

With the constitution stated above, narrow width member 114, the width of which is narrower than the portion close to rear edge 111b, is formed at the portion close to front edge 111a of card 101. Moreover, the right and left side edges are also parallel in narrow width member 114.

Figure 6:
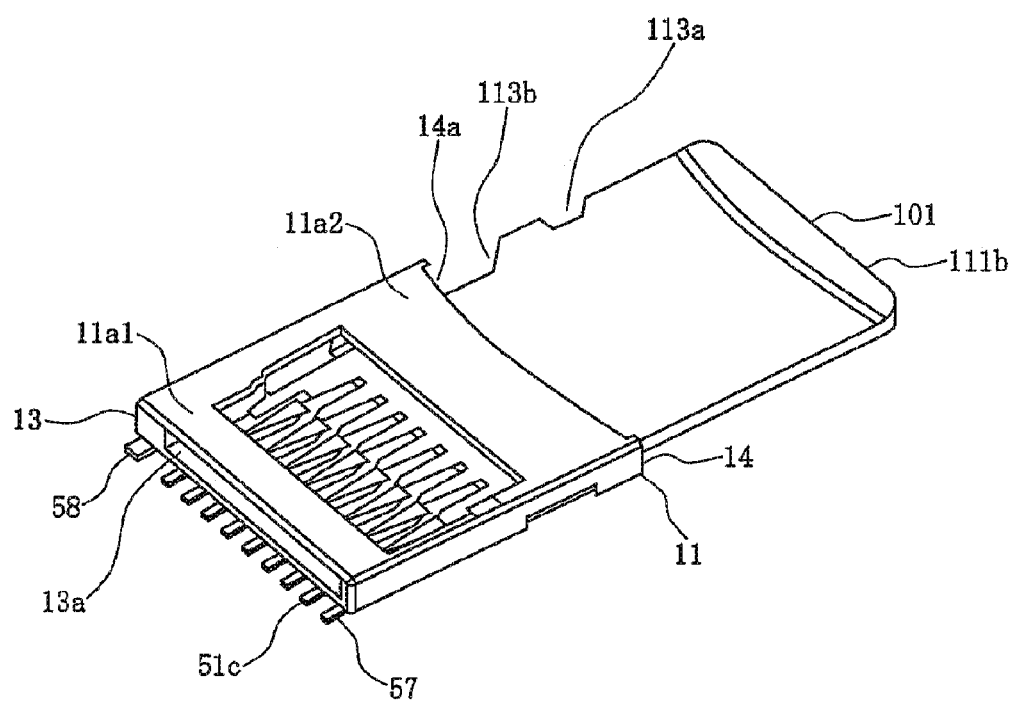
FIG. 6 is an oblique view showing the status in the course of inserting the card into the card connector of FIG. 1.

When inserting card 101, the user inserts card 101 from the rear direction of card connector 1 (the upper right direction shown in FIG. 6) into rear edge opening 14a of card insertion space 16 by utilizing their fingers or the like. Moreover, as shown in FIG. 6, card 101 is inserted into rear edge opening 14a of card insertion space 16 in a directional attitude so that the plane on which contact pads 151 is provided faces bottom plate 11b of housing 11, the plane on which contact pads 151 is not provided faces top plate 11a of housing 11, and front edge 111a constitutes the tip of the insertion direction. With the constitution as stated above, the side edge of card 101, on which first concave 113a and front notch 113b are formed, travels along second side plate lid of housing 11; and the other side edge of card 101 travels along first side plate 11c of housing 11.

Figure 7:
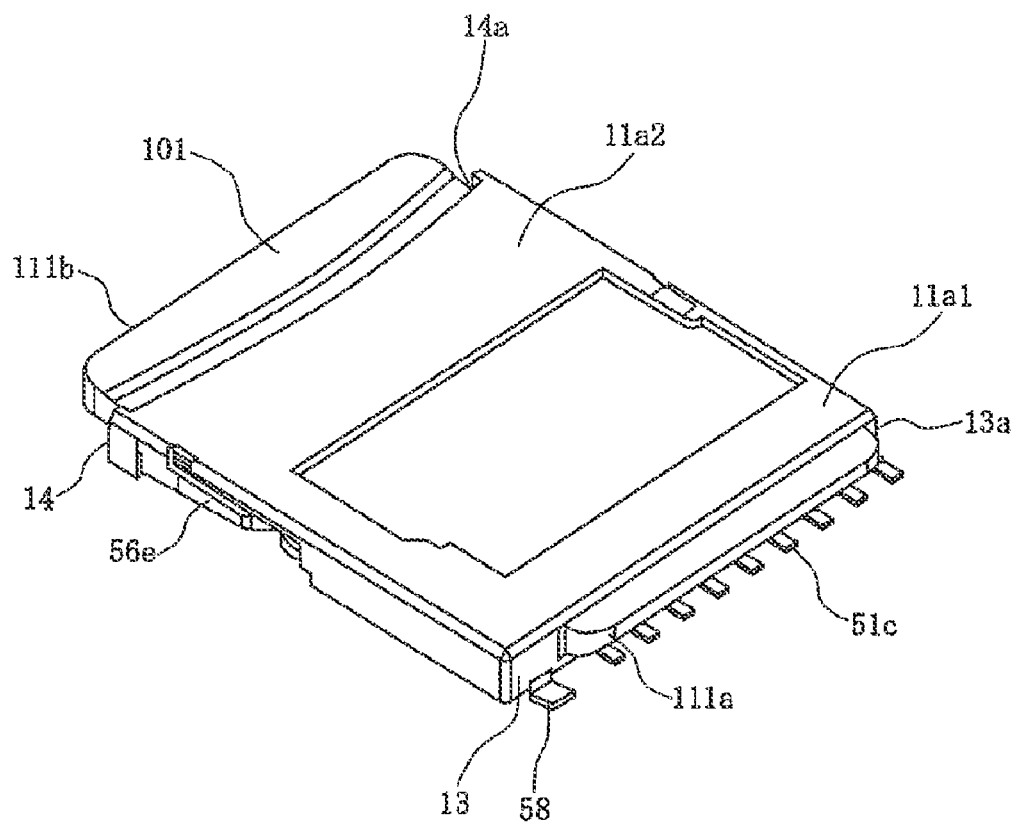
FIG. 7 is an oblique view showing the status in which the card has been inserted into the card connector of FIG. 1.
Figure 8:
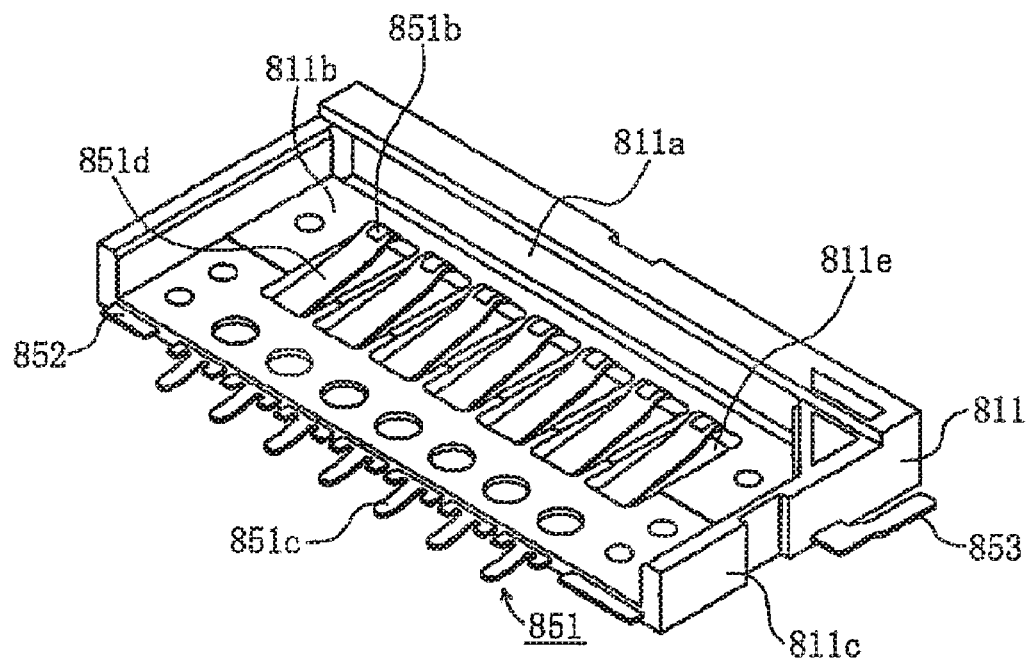
FIG. 8 is an illustration showing a traditional card connector.

Moreover, FIG. 6 shows the status in the course of inserting card 101, illustrating the state in which only front edge 111a and the vicinity thereof have been inserted from rear edge opening 14a of housing 11 into card insertion space 16. Subsequently, when the user further pushes in card 101 from the status shown in FIG. 6, front notch 113b of card 101 comes in contact with stopper 11g1 of housing 11, which stops the positions of card 101 from being changed relative to housing 11. With the operation stated above, the insertion of card 101 becomes completed, and the status shown in FIG. 7 is achieved.

Card 101, which has been inserted into card insertion space 16, is aligned in the front-back direction when front notch 113b comes in contact with stopper 11g1; and is aligned in the width direction when narrow width member 114 enters the space between position-determining member 11g and first side plate 11c. Moreover, each contact pad 151 comes in contact with contact member 51b of terminal 51 to render contact pad 151 conductive. Moreover, when card 101 is aligned in the front-back direction by causing front notch 113b to come in contact with stopper 11g1, card retaining convex member 56f of card retaining member 56e is inserted into and engaged with first concave 113a of card 101. Therefore, card 101 is securely retained in card connector 1, in the accurately aligned status, and with each contact pad rendered conductive to the respectively corresponding terminal 51. Moreover, in the present embodiment, as shown in FIG. 7, front edge 111a of card 101 is exposed forward from front edge opening 13a, and rear edge 111b of card 101 is exposed backward from rear edge opening 14a.

With the constitution as stated above, in the present embodiment, housing 11 has card insertion space 16 defined in four directions by top plate 11a and bottom plate 11b which are mutually facing, as well as a pair of mutually facing side plates, first side plate 11c and second side plate 11d, which link together the edges of top plate 11a and bottom plate 11b; terminals 51 are integrated with housing 11; card insertion space 16 has front edge opening 13a and rear edge opening 14a, in which front edge 111a and rear edge 111b of the inserted card 101 are exposed; and one of the side plates, second side plate 11d, has card retaining member 56e which is provided on an edge of the inserted card 101 and is engaged with first concave member 113a formed on the side edge of the inserted card 101 to retain the card, as well as position-determining member 11g which is provided on an edge of the inserted card 101 and is engaged with front notch 113b to determine the position of the inserted card 101 in the front-back direction and in the width direction. Additionally, card connector 1 is compact in size and takes a simple structure, and yet it is capable of accurately determining the position of the inserted card 101 as well as of securely retaining it.

Moreover, card connector 1 requires fewer parts, and can be formed in an integrated manner, and thus it becomes possible to obtain card connector 1 which can be manufactured easily at low cost, and yet is highly reliable. Moreover, top plate 11a has front top plate 11a1 and rear top plate 11a2 which are respectively provided close to front edge 13 and rear edge 14 of housing 11, as well as top plate opening 11f which is formed between front top plate 11a1 and rear top plate 11a2; bottom plate 11b has front bottom plate 11b1 and rear bottom plate 11b2 which are respectively provided close to front edge 13 and rear edge 14 of housing 11, as well as bottom plate opening lie which is formed between front bottom plate 11b1 and rear bottom plate 11b2; front top plate 11a1 and front bottom plate 11b1 enclose at least a part of the front half of card 101 with first side plate 11c and second side plate 11d, and rear top plate 11a2 and rear bottom plate 11b2 enclose at least a part of the rear half of card 101 with first side plate 11c and second side plate 11d.

With the constitution stated above, because top plate opening 11f and bottom plate opening 11e are formed, the amount of the molding material to form housing 11 can be reduced, and thus the cost can be reduced. On the other hand, because the areas in the vicinity of the front half and the rear half are respectively enclosed, the cross-sectional surface of housing 11 takes a closed cross-sectional structure as the front half and as the rear half. Consequently, the strength of housing 11 can be securely maintained. In addition, card 101 which has been inserted through top plate opening 11f can be visually checked, and thus the insertion conditions of card 101 can be easily checked.

Moreover, card connector 1 furthermore possesses reinforcing metal fitting 56, which is formed in an integrated manner with housing 11. Reinforcing metal fitting 56 includes the following members: metal fitting main body 56a, which extends in the width direction of housing 11; card retaining member 56e, which is connected to one end of metal fitting main body 56a; and side plate reinforcing member 56h, which is connected to the other end of metal fitting main body 56a. Side plate reinforcing member 56h faces card retaining member 56e, and is formed in an integrated manner with the other side plate, first side plate 11c.

With the constitution as stated above, side plate reinforcing member 56h is integrated with first side plate 11c, faces card retaining member 56e, which becomes engaged with first concave 113a formed on an edge of card 101, and is connected to card retaining member 56e through metal fitting main body 56a. Thus, card 101 can be securely retained by first side plate 11c and card retaining member 56e on both of its sides to reliably prevent card 101 from falling off from card connector 1.

Moreover, position-determining member 11g has inclined stopper 11g1, which is in contact with inclined member 113c of front notch 113b of card 101. As stated above, by causing inclined member 113c of card 101 to be in contact with inclined stopper 11g1, the position of card 101 in the front-back direction and in the width direction can be easily and securely conducted.

While a preferred embodiment of the Present Disclosure is shown and described, it is envisioned that those skilled in the art may devise various modifications without departing from the spirit and scope of the foregoing Description and the appended Claims.

What is claimed is:

1. A card connector, the card connector comprising:
    a housing, the housing including:
        terminal members into which a card is inserted; and
        a card insertion space, the card insertion space:
            being defined in four directions by a top plate, a bottom plate and a pair of side plates, the top and bottom plates being mutually facing and the side plates being mutually facing and linking the edges of the top and bottom plates; and
            having a front edge opening and a rear edge opening in which the front and rear edges of the card are exposed; and
    connection terminals, the connection terminals being integrated with and mounted in the housing and in contact with the terminal members;
    wherein one of the side plates has a card retaining member, the card retaining member being engaged with a first concave member formed on the side edge of the card to retain the card, and a position-determining member, the position-determining member being engaged with a second concave member formed on the side edge of the card to determine the position of the card.

2. The card connector of claim 1, wherein the top plate includes a front top plate and a rear top plate, the front and rear top plates being respectively provided close to the front and rear edges of the housing, as well as a top plate opening formed between the front and rear top plates.

3. The card connector of claim 2, wherein the bottom plate has a front bottom plate and a rear bottom plate, the front and rear bottom plates being respectively provided close to the front and rear edges of the housing, as well as a bottom plate opening formed between the front and rear bottom plates.

4. The card connector of claim 3, wherein the front top plate encloses at least a part of the front half of the card with the pair of the side plates.

5. The card connector of claim 4, wherein the front bottom plate encloses at least a part of the front half of the card with the pair of the side plates.

6. The card connector of claim 5, wherein the rear top plate encloses at least a part of the rear half of the card with the pair of the side plates.

7. The card connector of claim 6, wherein the rear bottom plate encloses at least a part of the rear half of the card with the pair of the side plates.

8. The card connector of claim 7, further comprising reinforcing metal fittings integrated with the housing.

9. The card connector of claim 8, wherein the reinforcing metal fitting includes a metal fitting main body extending in the width direction of the housing.

10. The card connector of claim 9, wherein the card retaining member is connected to the main body of one of the metal fittings.

11. The card connector of claim 10, wherein a side plate reinforcing member is connected to the other edge of the metal fitting main body.

12. The card connector of claim 11, wherein the side plate reinforcing member faces the card retaining member, and is integrated with the other side plate.

13. The card connector of claim 12, wherein the position-determining member has an inclined stopper that comes in contact with an inclined member of the second concave member of the card.

14. The card connector of claim 1, further comprising reinforcing metal fittings integrated with the housing.

15. The card connector of claim 14, wherein the reinforcing metal fitting includes a metal fitting main body extending in the width direction of the housing.

16. The card connector of claim 15, wherein the card retaining member is connected to the main body of one of the metal fittings.

17. The card connector of claim 16, wherein a side plate reinforcing member is connected to the other edge of the metal fitting main body.

18. The card connector of claim 17, wherein the side plate reinforcing member faces the card retaining member, and is integrated with the other side plate.

19. The card connector of claim 18, wherein the position-determining member has an inclined stopper that comes in contact with an inclined member of the second concave member of the card.

20. The card connector of claim 1, wherein the position-determining member has an inclined stopper that comes in contact with an inclined member of the second concave member of the card.

* * * * *